May 15, 1923.
H. P. CHILDRESS
PORTABLE VENTILATED SEAT
Filed Jan. 14, 1922
1,455,239
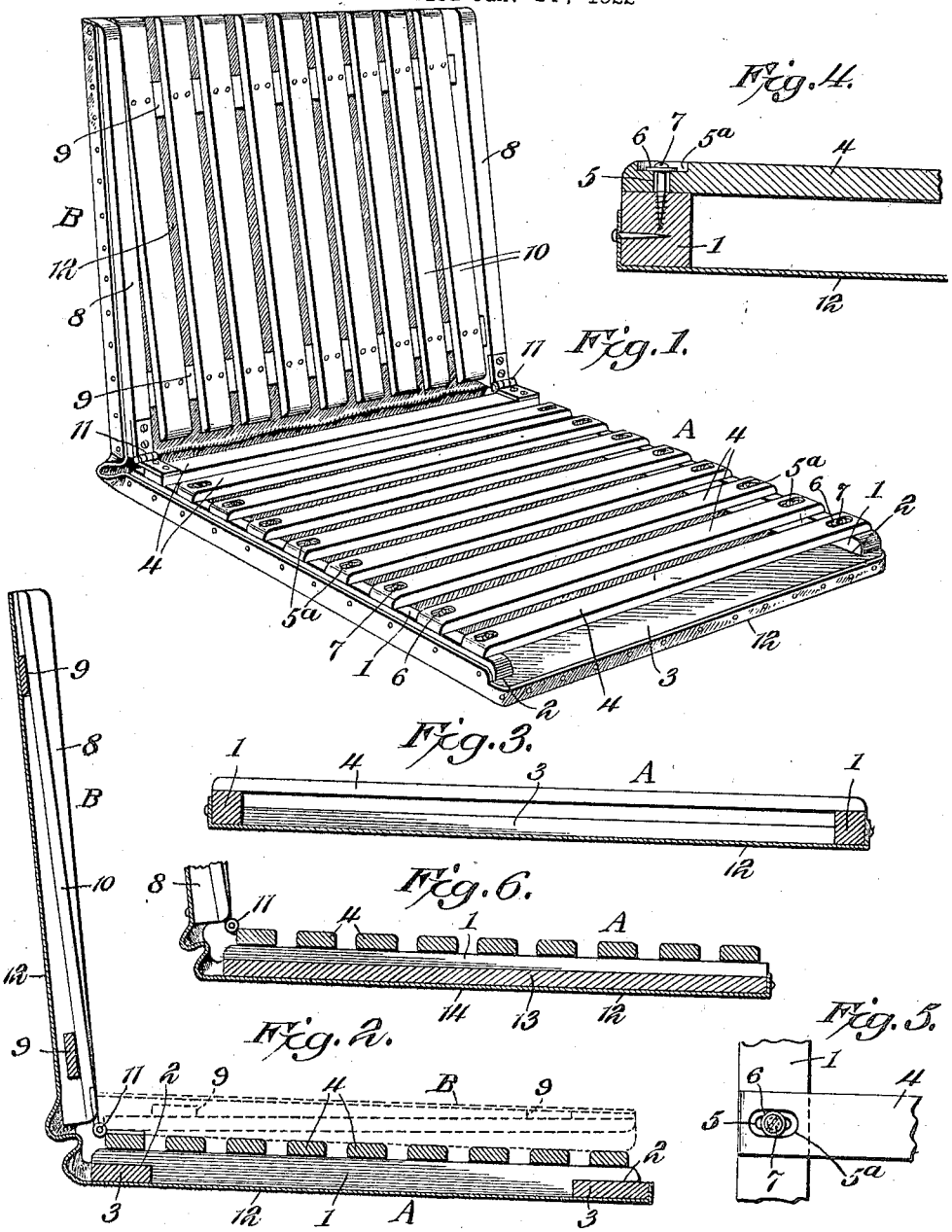
H. P. Childress, INVENTOR,
BY 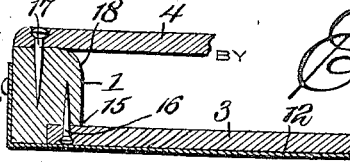
WITNESSES
ATTORNEY Patented May 15, 1923.

1,455,239

UNITED STATES PATENT OFFICE.

HENDERSON PIERCE CHILDRESS, OF MEMPHIS, TENNESSEE.

PORTABLE VENTILATED SEAT.

Application filed January 14, 1922. Serial No. 529,306.

*To all whom it may concern:*

Be it known that I, HENDERSON P. CHILDRESS, a citizen of the United States, residing at Memphis, in the county of Shelby and State of Tennessee, have invented new and useful Improvements in Portable Ventilated Seats, of which the following is a specification.

This invention relates to portable ventilated seats.

The object is to provide a simply and cheaply constructed seat for use especially in automobiles, which may be readily folded or unfolded and placed on the seat thereof, and which, by reason of its particular construction, enhances the cushioning effect of the automobile seat, thus materially adding to the ease and comfort of prolonged riding, and which will permit of a current of air passing beneath the bottom of the supplemental seat and upwardly behind the back thereof to impart a cooling effect and thus further increasing the comfort of the rider during hot weather.

A further object is to provide means whereby the back and bottom of the seat will simultaneously partake of the rising and falling action while going over bumps or rough places and obviating any friction between the back of the rider and the back of the seat, as when using the ordinary automobile seat.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a perspective view of a seat constructed in accordance with the present invention, and shown open and ready for use.

Figure 2 is a longitudinal sectional view through the same.

Figure 3 is a transverse sectional view through the seat proper.

Figure 4 is an enlarged detail sectional view illustrating the method of securing the ends of the spring slats forming the bottom of the seat.

Figure 5 is a detail plan view of the same.

Figure 6 is a longitudinal sectional view through the seat proper of a slightly modified form of construction.

Figure 7 is a detail sectional view showing a slightly modified form of securing certain members of the seat frame and the mounting of the spring slats.

Great discomfort is encountered in continuous or prolonged riding in automobiles in hot weather, particularly by stout or fleshy people, or those who perspire freely, by reason of the hot tufted leather or otherwise upholstered cushions, to which the clothing sticks, thus greatly detracting from the comfort and pleasure of riding. By the use of the present device not only is the resiliency of the cushions of the automobile seats materially added to, but the rider is supported in spaced relation to the said seat and back so that a current of air is constantly passing beneath and behind the rider to insure cooling and contributing greatly to his comfort.

While the seat is particularly adapted for use as above stated, it must be understood that the same may be used to equal advantage in other places, as the same is readily removable from the automobile, it being simply placed upon the automobile seats when in use as above, and it is also to be understood that the seat, while shown as constructed of slats formed of wood, may be constructed of metal or fiber or any other suitable material.

As shown in the drawing, the invention comprises a seat A and a back B hingedly connected together to permit of folding one member upon the other so that the seat may be conveniently carried or stored. The seat comprises a base frame including longitudinal sills 1 suitably mortised as at 2 (shown in Figure 2) at each end for the reception of transverse front and rear strips 3 which are suitably secured thereto as by nails or screws. The transverse strips 3 are of less thickness than the sills 1 and are connected to the latter so that the upper faces of the same are below the upper faces of the said sills. The base frame is preferably constructed of some strong durable wood, such as cypress, and the ends of the sills and the corners of the strips are rounded to prevent chafing or injuring the clothes of the user or the automobile cushions.

Resting upon the upper faces of the sills 1 and extending entirely across the base frame are a plurality of spaced slats 4 also formed of cypress to insure lightness and springiness, and these slats are also rounded on their upper end edges for a like purpose.

The slats 4 have adjacent to their ends, longitudinal slots 5 located so as to lie immediately over the upper faces of the sills and communicate with countersinks 5ª, for the reception of a washer 6 and a screw 7 traversing the slot and entering the said sill, the washer resting in the countersink and the upper end of the screw being below the upper face of the slat, as clearly shown in Figure 4 of the drawing.

The back B comprises longitudinally disposed bars 8 of substantially equal dimensions and arranged in alinement with the aforesaid sills 1, said bars being connected by transverse strips 9 suitably secured to the bars as by mortise and tenon, the upper or outermost transverse strip 9 being located nearer to the back or under edge of the bars 8 than the other transverse strip 8, as will be seen in Figure 2. This arrangement provides proper inclination to longitudinally disposed slats 10, arranged at right angles to the seat slats and suitably secured in spaced relation to each other to the strips 9 as by nails or screws, the ends of the bars 8 as well as the end edges of the slats 10 exposed to the body of the rider being rounded in the manner heretofore described.

The adjacent ends of the bottom sills 1 and the back bars 8 are connected together by ordinary hinges 11 attached in the ordinary manner, and a sheet of heavy canvas duck, corduroy or other strong and durable fabric 12 is secured to the corresponding under sides of the bottom and back, the edges of the material being drawn up over the front edge of the bottom and secured by tacks and also over the side edges of the bottom and back and secured in like manner, ample goods being allowed at the fold to permit of closing the back over and upon the bottom in a well known manner.

A special advantage of this construction is that the fabric bottom clings to the seat of the automobile and accommodates itself to its curved shape and will not shift around.

In Figure 6, the front and rear transverse strips 3 are eliminated and a continuous facing or panel of boards is substituted as at 13, in which case the covering material 14 is secured to the lower face of the latter which extends from the front to the rear of said bottom.

In Figure 7, there is illustrated a modified form of securing the transverse strips 3 to the sills 1. In this form, the said sills are provided on their under faces with rabbets 15 extending from their inner edges substantially halfway across the lower face thereof into which the ends of the strips 3 are seated and secured as by a nail 16. In lieu of the slot and screw arrangement, as shown in the preceding figures and description thereof, the slats 4, as shown in Figure 7, may simply rest on the top faces of the sills 1 and be secured thereto by one or more nails 17 passing through the slats near their ends and into the upper faces of the sills. The inner corners of the sills may be rounded, as shown at 18, to permit the downward flexing of the slats in either of the forms of construction shown.

By reason of the fact that the slats of the seat member are arranged transversely and the slats of the back member are disposed longitudinally, there is a circulation of air beneath the slats of the seat member from the front to the rear of the latter, and then upwardly between the slats of the back member, the resiliency of the slats of the seat member exerting a form of pumping action to assist the circulation of air as the slats rise and fall by the jolting of the car, and the slats of the back member combining with the fabric covering to form air conduits.

From the foregoing, it will be seen that a simply constructed, cheaply manufactured seat has been provided, constructed entirely of wood, which provides for a continuous current of air passing beneath the seat slats and back of the back slats to prevent perspiring, and that by reason of the flexible slats comprising the bottom and back, ample cushioning effect is obtained.

What I claim is:—

1. A ventilated supplemental seat comprising a seat member and a back member, and means for hingedly connecting the two members to permit one to fold upon the other; the seat member including longitudinal side sills and transverse resilient slats resting upon and connecting the same, the back member including longitudinal bars, transverse strips connecting said bars, and spaced longitudinal slats secured to the strips, and a continuous fabric covering at the bottom of the seat member and the rear of the back member, said covering being secured to the side sills and the side bars and loosely spanning the hinged connection and arranged across the bottom of the seat member and the rear of the back member; the slats of the back member combining with the covering to form a plurality of air conduits, said covering being spaced from the slats at the front of the seat member to provide for the circulation of air, and serving to cling to the seat of the automobile and accommodate itself to the curved shape thereof and thereby held from shifting movement.

2. A ventilated supplemental seat comprising a seat member and a back member hingedly connected to fold one upon the other, said seat having a base frame including side sills and front and rear strips connecting the same at their ends, the tops of the strips being lower than the tops of the sills, a plurality of transverse resilient slats arranged in spaced relation and extending from sill to sill and resting upon the same, means for loosely securing the slats at their ends to the sills to permit their limited movement, said back member comprising longitudinal side bars connected by transverse strips, longitudinal slats secured to the strips, and a continuous fabric covering secured to the side sills and the side bars and extending across the under sides of the bottom and back and loosely spanning the hinged connection to permit folding of the same, the slats of the back member combining with the covering to form a plurality of air conduits, the front of the seat being open and the covering being spaced from the seat to provide a ventilating space between the slats and the covering, said covering acting to hug the seat of the automobile and accommodate itself to the curved shape thereof and held thereby from shifting movement.

In testimony that I claim the foregoing as my own, I have hereto affixed my signature.

HENDERSON PIERCE CHILDRESS.